(12) United States Patent
Biel

(10) Patent No.: US 9,851,043 B2
(45) Date of Patent: Dec. 26, 2017

(54) CRACK ARRESTOR

(71) Applicant: Stress Engineering Services, Inc., Houston, TX (US)

(72) Inventor: Richard C. Biel, Cypress, TX (US)

(73) Assignee: Stress Engineering Services, Inc., Houston, TX (US)

( * ) Notice: Subject to any disclaimer, the term of this patent is extended or adjusted under 35 U.S.C. 154(b) by 0 days.

(21) Appl. No.: 15/000,889

(22) Filed: Jan. 19, 2016

(65) Prior Publication Data

US 2016/0363250 A1 Dec. 15, 2016

Related U.S. Application Data

(60) Provisional application No. 62/174,223, filed on Jun. 11, 2015.

(51) Int. Cl.
*F16L 55/16* (2006.01)
*F16L 57/02* (2006.01)

(52) U.S. Cl.
CPC .................... *F16L 57/02* (2013.01)

(58) Field of Classification Search
CPC ........ F16L 57/02; B23P 11/02; Y10T 29/4994
USPC ..................... 138/99, 97, 172, 178
See application file for complete search history.

(56) References Cited

U.S. PATENT DOCUMENTS

| | | | |
|---|---|---|---|
| 2,795,523 A * | 6/1957 | Cobb | B23P 6/04 138/99 |
| 2,924,546 A * | 2/1960 | Shaw | F16L 55/1686 137/15.08 |
| 3,096,105 A | 7/1963 | Risley | |
| 3,349,807 A | 10/1967 | Penman | |
| 3,457,963 A | 7/1969 | Hardwick | |
| 3,698,746 A | 10/1972 | Loncaric | |
| 3,768,269 A | 10/1973 | Broussard et al. | |

(Continued)

FOREIGN PATENT DOCUMENTS

EP 1977151 A2 10/2008

OTHER PUBLICATIONS http://www.tecma.it/EN/clock.php Products: Pipeline repair and reinforcement system / Clock spring, TECMA SRL, tecma.it, 2009, 3 pages.

(Continued)

*Primary Examiner* — Patrick F Brinson
(74) *Attorney, Agent, or Firm* — Christopher McKeon; Arnold & Saunders, LLP

(57) ABSTRACT

A crack arrestor apparatus and method for making same by applying layers of a composite material of non-metallic fibers and resin around a length of pipe; the fibers generally aligned with the pipe circumference. The applied layers have a thicker portion in the middle and a thinner portion on the ends. Part of the pipe covered by the thicker portion is then yielded by application of radial force past the elastic limit of the pipe, thereby creating circumferential tension on the composite. At least a portion of the composite remains in circumferential tension upon release of the radial force. The residual stresses in the yielded metal pipe assist to arrest crack propagation. Thereby, the process to arrest a crack in a metal pipe includes maintaining circumferential tension in a composite residing around the pipe while maintaining compressive circumferential residual stress on the metal pipe covered by the composite.

11 Claims, 2 Drawing Sheets

(56) References Cited

U.S. PATENT DOCUMENTS

| | | | |
|---|---|---|---|
| 3,860,039 A | 1/1975 | Ells | |
| 3,870,350 A | 3/1975 | Loncaric | |
| 3,873,139 A | 3/1975 | McCabe | |
| 3,880,195 A | 4/1975 | Goodrich et al. | |
| 4,148,127 A * | 4/1979 | Somerville | B21D 39/04 |
| | | | 138/172 |
| 4,176,691 A | 12/1979 | Jude et al. | |
| 4,180,104 A | 12/1979 | Park et al. | |
| 4,195,669 A | 4/1980 | Ives et al. | |
| 4,224,966 A | 9/1980 | Somerville | |
| 4,284,107 A | 8/1981 | Grose | |
| 4,327,473 A * | 5/1982 | Somerville | B21D 39/04 |
| | | | 138/155 |
| 4,383,556 A | 5/1983 | Evgenievich et al. | |
| 4,559,974 A * | 12/1985 | Fawley | B29C 53/66 |
| | | | 138/172 |
| 4,644,975 A | 2/1987 | Fricker | |
| 4,676,276 A | 6/1987 | Fawley | |
| 4,682,632 A | 7/1987 | Wiedenhoff et al. | |
| 4,700,752 A * | 10/1987 | Fawley | B29C 53/66 |
| | | | 138/172 |
| 4,711,387 A | 12/1987 | Paton et al. | |
| 5,518,568 A | 5/1996 | Fawley et al. | |
| 5,632,307 A * | 5/1997 | Fawley | F16L 55/1686 |
| | | | 138/97 |
| 5,677,046 A | 10/1997 | Fawley et al. | |
| 5,683,530 A | 11/1997 | Fawley et al. | |
| 6,276,401 B1 * | 8/2001 | Wilson | F16L 58/1063 |
| | | | 138/172 |
| 6,336,983 B1 | 1/2002 | Fawley | |
| 6,435,218 B2 * | 8/2002 | Hillenbrand | F16L 57/02 |
| | | | 138/172 |
| 7,938,146 B2 * | 5/2011 | Brooks | F16L 55/1683 |
| | | | 138/97 |
| 8,353,317 B2 * | 1/2013 | Krishnaswamy | F16L 57/02 |
| | | | 138/172 |
| 8,418,337 B2 * | 4/2013 | Salama | B29C 70/086 |
| | | | 138/172 |
| 2010/0147409 A1 | 6/2010 | Lu et al. | |
| 2014/0048164 A1 * | 2/2014 | Souza | F16L 55/172 |
| | | | 138/97 |

OTHER PUBLICATIONS

Memorizing and detecting an arrested crack in a foam-core sandwich structure using embedded plastic materials and fiber-optic sensors, Smart Materials and Structures 21.5 (2012): 055025, Shu Minakuchi, et al., 2 pages.
http://www.osti.gov/ Composite wrap approved for US gas-pipeline repairs, Oil and Gas Journal 93.41 (1995), W.R. True, 2 pages.
http://www.clockspring.com/products/crack-arrestor/ Crack Arrestor, Clock Spring®, Mar. 15, 2012, 2 pages.

* cited by examiner

CRACK ARRESTOR

CROSS REFERENCE TO RELATED APPLICATIONS

This application claims the benefit of U.S. Provisional Application 62/174,223, filed Jun. 11, 2015.

BACKGROUND OF THE INVENTION

1. Field of the Invention

Examples of the subject matter disclosed herein generally relate to apparatus, methods and systems for arresting cracks in ductile steel pipelines.

2. Background

Modern gas pipelines operate at high pressures that result in circumferential (hoop) stresses that are up to 80% of the steel's specified minimum yield strength. Crack arrestors are used in these pipelines to stop the unrestricted axial fractures that initiate due to damage from corrosion and construction equipment such as backhoes. Some previous forms of crack arrestors increase the hoop resistance of the pipeline steel to stop the crack from further propagation.

If the crack, or axial fracture, encounters an abrupt change in hoop stiffness or resistance at the crack arrestor, the crack may change direction from axial to circumferential. Since the tear or crack now starts to propogate around the circumference of the pipe, this occurrence is commonly referred to as "ring-out". The circumferential crack may cause the pipe to separate into two parts with the still-pressurized parts acting with an unrestrained jetting action. The unrestrained jetting action may eject the buried pipe segments out of its trench or cause an above ground pipe to whip violently.

U.S. Pat. No. 3,349,807 to Penman discloses particular means for limiting the extent to which high pressure compressible fluid conduits may rip should a crack form in a conduit. A circumferential steel strap is used which has a length slightly less than the perimeter of the conduit and tightening the band onto the conduit by two flanges formed on the respective ends of the bands which are pulled together by a series of bolts. Pennman '807 fails to disclosue maintaining circumferential tension in a composite material wherein the composite material resides around a metal pipe; and maintaining compressive circumferential residual stress on the pipe with the composite material. Penman '807 fails to teach disposing a composite material around a length of metal pipe; wherein the composite material comprises non-metallic fibers and resin; wherein the disposed composite material comprises fibers aligned to the pipe circumference; applying radial force inside the pipe, the applied radial force yielding the pipe past the elastic limit of the pipe and creating circumferential tension on at least a portion of the composite material; wherein the radial force inside the pipe is applied with hydraulic or mechanical means or a combination of both as is used by a pipe expander; and wherein at least a portion of the composite material remains in circumferential tension upon release of the applied radial force. Pennman '807 fails to disclose maintaining circumferential tension in a composite material where the composite material resides around a metal pipe; and maintaining compressive circumferential residual stress on the pipe with the use of the composite material.

U.S. Pat. No. 4,559,974 to Fawley discloses a crack arrester for stopping a propagating ductile fracture in an object such as a pipe that comprises a band defined by a plurality of continuous, high tensile strength, nonmetallic fibers which are wound around the object in intersecting relationship with the direction of propagation and are encapsulated in a resin matrix which is cured. Fawley '974 fails to teach applying a radial force inside the pipe, wherein the radial force inside the pipe is applied with hydraulic or mechanical means or a combination of both as is used by a pipe expander; the applied radial force yielding the pipe past the elastic limit of the pipe and creating circumferential tension in at least a portion of the composite material; and wherein at least a portion of the composite material remains in circumferential tension upon release of the applied radial force. Fawley fails to teach or suggest maintaining circumferential tension in a composite material. Fawley also fails to teach or suggest maintaining a residual stress in the pipe. Fawley '974 does not disclose use of a radial force or over-strain to establish an initial compressive residual stress in the metal as disclosed above.

U.S. Pat. No. 6,435,218 to Hillenbrand et al. discloses pipe with crack stopper feature comprising a steel pipe which includes an outer corrosive-preventive protective sheath, which has a surface layer of plastic material, and a crack stopper zone extending over a section of the pipe. The crack stopper zone includes a bandage which is wrapped around the pipe section and made of high-strength fiber material imbedded in a compacted matrix of thermoplastic and thermosetting plastic. The bandage is comprised of a plurality of wound layers joined to one another via the matrix by welding or gluing. Hillenbrand '218 fails to teach applying a radial force inside the pipe wherein the radial force inside the pipe is applied with hydraulic or mechanical means or a combination of both as is used by a pipe expander; the radial force applied yielding the pipe past the elastic limit of the pipe and creating circumferential tension on at least a portion of the composite material; and wherein at least a portion of the composite material remains in circumferential tension upon release of the applied radial force.

Several patents describe the use of composite materials to make a crack arrestor by simply adding the composite material to the pipeline metal. These patents do not intentionally impose a compressive residual stress on the metal. This is important since I find that the imposed residual stresses on the metal causes the crack to stop its progress, which is the intent of the crack arrestor. A novel point, therefore, is that the crack arrestor if made as I propose should require less composite material in manufacturing. This is because the arresting action does not solely depend on the strength and quantity of the composite materials; the residual compressive stresses in the metal play a major role in arresting the crack by reducing the tensile hoop stresses of the metal in operation.

BRIEF SUMMARY OF THE INVENTION

In a set of examples, a process is disclosed for arresting a crack in a pipe, the process including: maintaining circumferential tension in a composite material where the composite material resides around a metal pipe; and maintaining compressive circumferential residual stress on the pipe with the composite material.

In one example, the composite material is non-metallic fibers and resin.

In a set of examples, a method is disclosed for making a crack arrestor, the method including: disposing a composite material around a length of pipe; where the composite material comprises non-metallic fibers and resin; where the disposed composite material comprises fibers aligned to the pipe circumference; applying radial force inside the pipe, the radial force applied yielding the pipe past the elastic limit of the pipe and creating circumferential tension on at least a portion of the composite material; and where the at least a portion of the composite material remains in circumferential tension upon release of the applied radial force.

In one example, a mechanical or hydraulic pipe expander yields the pipe past the elastic limit of the pipe. In one example, the pipe material is ductile. In one example, the radial force inside the pipe is applied with hydraulic or mechanical means or a combination of both as is used by a pipe expander.

In one example, the composite material remaining in tension is bounded along the axis of the pipe by disposed composite material tapered in thickness from the thickness of the said composite material remaining in tension.

In a set of examples, a crack arrestor is disclosed, the crack arrestor including: a metal pipe having a length and an outer surface wherein a portion of the length of the metal pipe is comprised of yielded metal; a composite material having a first thickness in circumferential tension disposed circumferentially around the outer surface of the yielded metal portion of the metal pipe and having a second thickness is disposed circumferentially around the outer surface of the metal pipe axially adjacent to the yielded metal portion; where the second thickness is less than the first thickness.

In one example, the second thickness decreasingly tapers in thickness from the first thickness in the axial direction away from the yielded metal portion.

In one example, the second thickness decreasingly tapers step-wise in thickness from the first thickness in the axial direction away from the yielded metal portion.

In one example, the composite material is non-metallic fibers and resin.

In one example, the axial length of the first composite material thickness is at least one-half of the pipe diameter.

In a set of examples, a crack arrestor is disclosed, the crack arrestor including: means for maintaining circumferential tension in a composite material wherein the composite material resides around a metal pipe; and means for maintaining compressive circumferential residual stress on the pipe with the composite material.

BRIEF DESCRIPTION OF THE SEVERAL VIEWS OF THE DRAWING

FIG. 3a illustrates a side view cut-away cross section of the example pipe and disposed crack arrestor, with location of application of radial force is schematically indicated.

FIG. 3b illustrates a radial end view cut-away cross section of the example pipe and disposed crack arrestor.

DETAILED DESCRIPTION

U.S. Provisional Application 62/174,223, of filing date Jun. 11, 2015 is hereby incorporated herein by reference.

Figure 3:
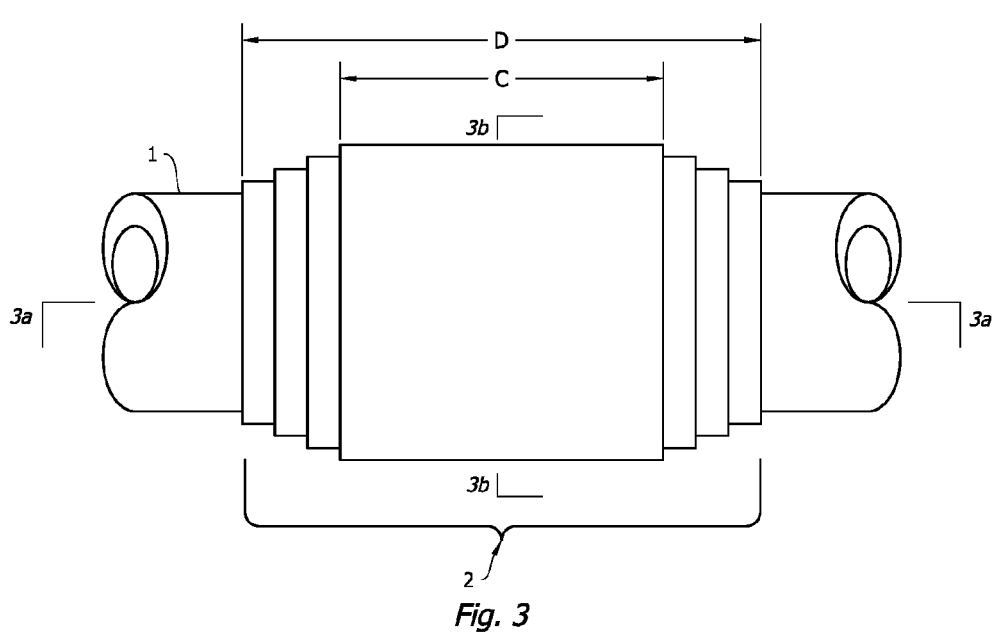
FIG. 3 illustrates a side view of an example of a pipe with a crack arrestor disposed about the circumference of the pipe. The locations of sectional views

In one example, my invention is circumferentially wrapping a joint or section of metal pipe with a fiber and resin composite. The modified sections of pipe are installed on the pipeline at regular intervals using conventional means as other sections of pipe. The modified sections of pipe have wraps of fiber and resin composite installed with the fibers generally in the hoop direction to reinforce the metal pipe and resist axial cracks. In one example, the thickness of the fiber and resin composite begins in a thin section and increases in thickness in a tapered fashion so as to gradually increase the thickness of the composite material layer until the full composite material thickness is achieved as shown in FIG. 3. In one example, the axial length of the full composite material thickness is typically one-half of the pipe diameter or more. After curing the composite material, a portion of the pipe wrapped with the full composite material thickness is subjected to a radial force that causes the ductile pipe metal to yield without causing the composite fibers to break. The radial force inside the pipe is applied, in one example, with hydraulic or, in example, mechanical means or, in example, a combination of both as is done using a pipe expander. The radial force results in the metal of the pipe in the radially-forced zone being in initial hoop compression after the radial-force process. Subsequent pressurizations in normal operations will not alter the residual stress resulting from the radial-force process. In the descriptions that follow, the term "crack arrestor" is comprised of the composite material and the pipe that has been subjected to radial force, both which together are the subject of this invention.

In one example, the improved crack arrestor is used in new or existing pipelines. This is done by welding in a shop-built crack arrestor pipe section. When the crack arrestor has been built and installed in a pipeline, a crack propagating along the pipe will encounter increasing stiffness. The fiberglass and resin composite in the initially encountered thinner layers reduces the rate of propagation. This first action causes the thinner layers of the composite material to fail. The crack encounters a successively thicker composite material layer that slows the crack propagation. Finally, the crack encounters the zone of residual hoop compression in the pipe that will not allow for further crack propagation.

Figure 1:
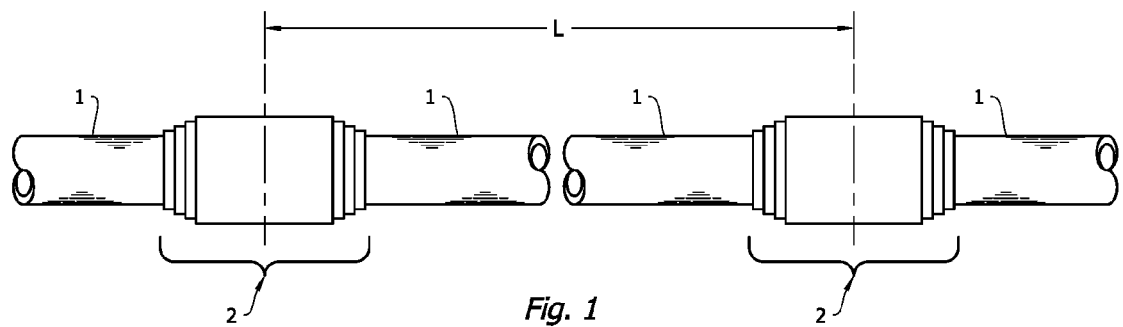
FIG. 1 illustrates a side view of a pipe with an example of two crack arrestors disposed about the circumference of the pipe.

FIG. 1 illustrates a side view of a pipe with two crack arrestors disposed about the circumference of the pipe. A metal pipe 1 is illustrated with a crack arrestor 2 disposed about the circumference of the pipe 1. At a predetermined interval L along the axis of pipe 1, a second crack arrestor 2 is disposed about the circumference of the pipe 1. In one example, the predetermined interval L is 1000 feet.

Figure 2:
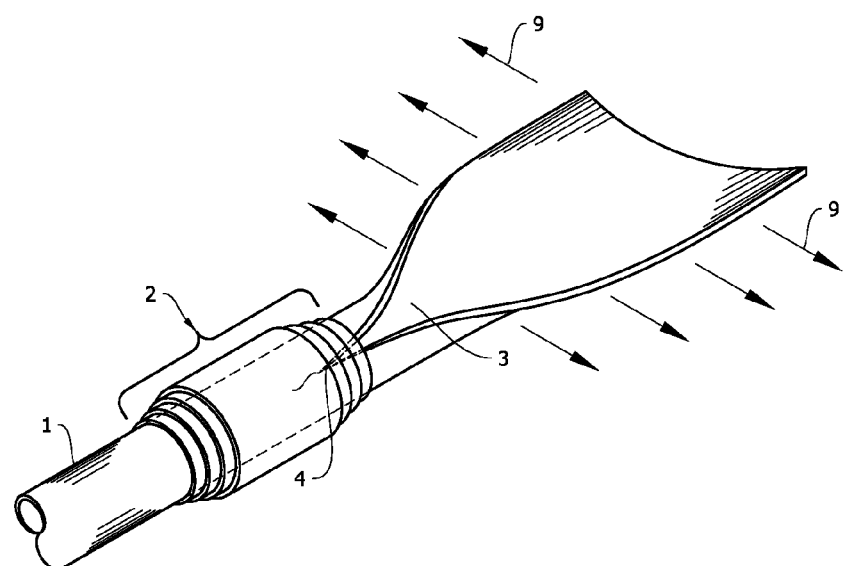
FIG. 2 illustrates a perspective 3-D view of an example of a pipe splayed open by an axially propagated crack, the crack arrested by a crack arrestor disposed about the circumference of the pipe.

FIG. 2 illustrates a perspective 3-D view of an example of a pipe splayed open by an axially propagated crack, the crack arrested by a crack arrestor disposed about the circumference of the pipe. Metal pipe 1 is illustrated with an axially propagated crack 4 which has splayed open the pipe 1, exposing the inside surface 3 of the pipe 1 and the fissure edges of the crack. Crack arrestor 2 is disposed about the circumference of the pipe 1. Arrows 9 indicate the general direction of the splaying of the pipe 1. The fissure edges of the crack transition into an opening fissure of the crack, which is illustrated by the dashed line underneath the disposed crack arrestor 2. The opening fissure of the crack terminates at a crack tip or apex, underneath the disposed crack arrestor 2.

Figure 3A:
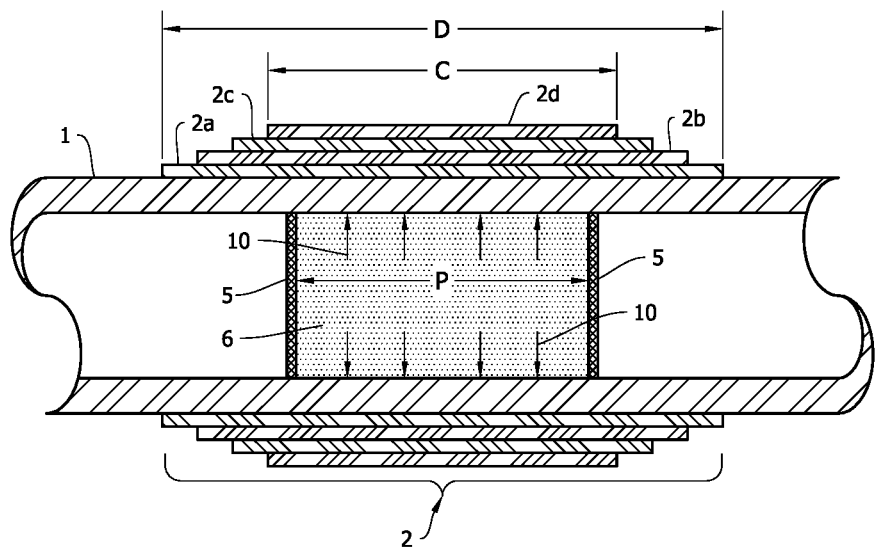
FIG. 3a and FIG. 3b are indicated on this FIG. 3.
Figure 3B:
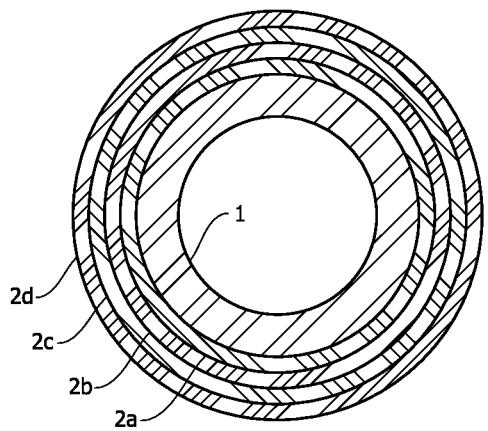

FIG. 3 illustrates a side view of an example of a pipe 1 with a crack arrestor 2 disposed about the circumference of the pipe. The locations of sectional views FIG. 3a and FIG. 3b are indicated on this FIG. 3. In the example as illustrated, a full thickness zone C of crack arrestor 2 is shown in the middle portion, along the axis, of crack arrestor 2. A zone D shows the portion of the pipe 1 that is covered by at least some thickness of crack arrestor 2. A crack could propagate from right to left, or left to right, as viewed by a person facing the pipeline at a right angle to the centerline of the pipe. Thus, in one example, the crack arrestor is symmetrical on each side of a plane that would cut the pipe at a right angle to the centerline of the pipe.

FIG. 3a illustrates a side view cut-away cross section of the example pipe and disposed crack arrestor, with location of application of radial force schematically indicated. A crack arrestor 2 is disposed about the circumference of a pipe 1. In one example, crack arrestor 2 comprises four layers: an innermost layer 2a that is disposed circumferentially against the outer surface of the pipe 1, followed by additional layers 2b, 2c, and 2d. In this example, the innermost layer 2a is the longest layer in the axial direction of the pipe 1. An intermediate layer 2b is disposed circumferentially against the outer surface of preceding layer 2a. In this example, the axial length of intermediate layer 2b is shorter than the axial length of innermost layer 2a. One or more intermediate layers are present. In the example as illustrated, an intermediate layer 2c is disposed circumferentially against the outer surface of preceding layer 2b. In this example, the axial length of intermediate layer 2c is shorter than the axial length of intermediate layer 2b and innermost layer 2a. An outer layer 2d is disposed circumferentially against the outer surface of preceding layer 2c. In this example, the axial length of intermediate layer 2d is shorter than the axial length of intermediate layer 2c and intermediate layer 2b and innermost layer 2a.

In this example, two zones are defined along the axial length of the wrap of disposed crack arrestor 2. A zone D extends along the axis of the pipe 1 across the length of layer 2a. A zone C extends along the axis of the pipe 1 across the length of full thickness of the combined layers 2a, 2b, 2c, 2d. In the illustrated example, the layers 2a, 2b, 2c, 2d are of successively shorter axial length. At the axial edges of the layer assembly, only layer 2a is present and thus the axial edges are thinner than the middle portion where both layers 2a and 2b are present. Further towards the middle, the assembly is thicker due to the presence of additional layer 2c. Further towards the middle, a full thickness is achieved due to the presence of additional outermost layer 2d. Less than full thickness defines taper zones that exist at the axial edges of the layer assembly, where outermost layer 2d is not present. A full thickness zone C is defined where outermost layer 2d is present, towards the middle of the layer assembly. A radial force zone P is defined within zone C, at an axial distance from the axial edges of the layers 2a, 2b, 2c, 2d and where outermost layer 2d is present. In one example, the radial force zone P is defined at a distance from the taper zones and within the full thickness zone C. In one example, the radial force zone is defined at a distance from the taper zones, an inset distance, sufficient to reduce edge effects from the tapering thickness in the radial force zone.

In one example, as illustrated, the location of application of the radial force is schematically indicated. An area 6 indicates the inside surface of the pipe 1 that is in the radial force zone P. In one example, a mechanical or hydraulic pipe expander, disposed in this area 6, yields the pipe 1 past the elastic limit of the pipe within radial force zone P. Arrows 10 indicate the radial yielding forces applied or otherwise exerted in the radial force zone P during the manufacture of crack arrestor 2 to achieve the compressive residual stress of pipe 1 in radial force zone P. Boundaries 5 indicate the boundary or extent of the radial force zone P. In one example, boundaries 5 are at some distance from the extent of the full thickness (zone C) of the composite material.

In one example, the axial distance radial force zone P is less than the axial distance of the full thickness zone C. In one example, the value of this inset distance required on a particular pipeline depends on the thickness of the wall of the pipeline steel. In one example, the value of the inset distance on a particular pipeline is determined by analysis to reduce the edge effects. In one example, the axial distance radial force zone P is less than the axial distance of the full thickness zone C by an amount that is approximately 0.2 times the diameter of the pipe.

The radial force applied in zone P is sufficient to expand the wall of pipe 1 metal to beyond the yield point of the metal. The radial force results in the metal of the pipe in the radial-forced zone being in residual hoop compression after the radial-force process. The radial-force process does not cause the composite fibers to break, or, if there is any breakage of fibers, the breakage is not significant to the operation of the crack arrestor.

FIG. 3b illustrates a radial end view cut-away cross section of the example pipe and disposed crack arrestor. The location of application of radial force is not indicated in this Figure. In the example as illustrated, the composite material layers of crack arrestor 2 (denoted by layers 2a, 2b, 2c, 2d) are disposed about the circumference of a pipe 1. Innermost layer 2a is disposed circumferentially against the outer surface of the pipe 1, followed by additional intermediate layers 2b, 2c. An outer layer 2d wraps about layer 2c. In other examples, fewer or more intermediate layers may be disposed. The crack arrestor composite materials in this example is formed from the assemblage of multiple layers.

Figure 4:
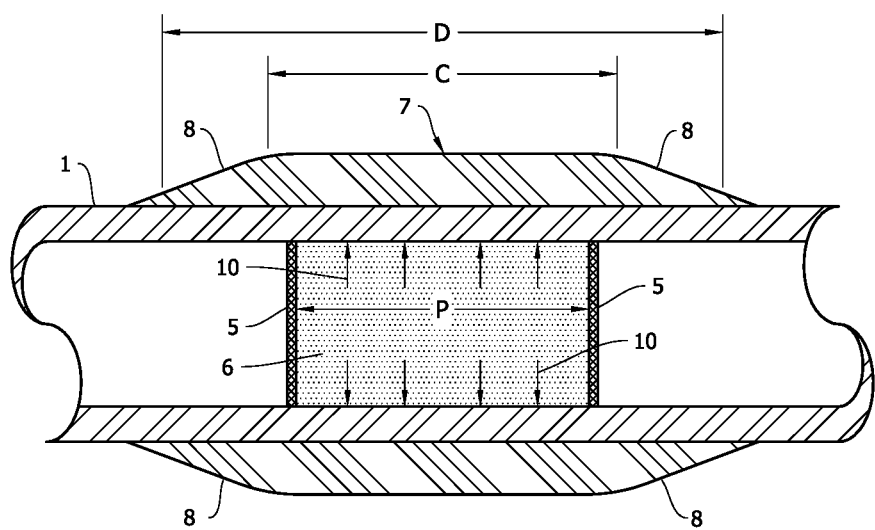
FIG. 4 illustrates a side view cut-away cross section of an example pipe and disposed crack arrestor with, in example, tapered ends, and with location of application of radial force schematically indicated.

FIG. 4 illustrates a side view cut-away cross section of an example pipe and disposed crack arrestor composite materials with, in example, tapered ends, and with location of application of radial force schematically indicated. A crack arrestor 2 is disposed about the circumference of a pipe 1. In one example, crack arrestor 2 comprises one or more layers circumferentially disposed or otherwise wrapped against the outer surface of the pipe 1.

In this example, two zones are defined along the axial length of the disposed crack arrestor 2. A zone D extends along the axis of the pipe 1 across the length of crack arrestor 2. A zone C extends along the axis of the pipe 1 across the length of full thickness 7 of arrestor 2 and is contained in zone D. The thickness of crack arrestor 2 tapers on the axial ends 8 of the arrestor 2 in the two end portions of zone D that are not contained in the full thickness zone C.

In one example, as illustrated, the location of application of a radial force is schematically indicated. An area 6 indicates the inside surface of the pipe 1 that is in the radial force zone P. In one example, a mechanical or hydraulic pipe expander, disposed in this area 6, yields the pipe 1 past the elastic limit of the pipe within the radial force zone P. Arrows 10 indicate the radial yielding forces applied or otherwise exerted in the radial force zone P during the manufacture of crack arrestor 2 to achieve the compressive residual stress of pipe 1 in the radial force zone P. Boundaries 5 indicate the boundary or extent of the radial force zone P. In one example, boundaries 5 are at some distance from the extent of the full thickness (zone C) of the composite materials.

In one example, crack arrestor 2 is made up of a metal pipe 1. A composite material, for example one or more of layers 2a, 2b, 2c, or 8, is disposed in circumferential tension around the outer surface, along an axial portion, of pipe 1. An additional thickness of composite material, for example layer 2d, or full thickness 7, is disposed circumferentially around the outer surface of the metal pipe axially adjacent to a yielded metal portion of the metal pipe 1. In one example, the full thickness 7 decreasingly tapers in thickness from the full thickness in the axial direction away from the yielded metal portion, e.g. along the axial ends 8 of arrestor 2. In one example, the full thickness (for example, layers 2a, 2b, 2c, 2d combined) decreasingly tapers step-wise in thickness (for example, 2c, then 2b, then 2a) from the full thickness in the axial direction away from the yielded metal portion. In one example, the composite is made up of non-metallic fibers and resin. In one example, the fibers are generally oriented along the circumferential path around the outer surface of pipe 1. In one example, the composite material is wrapped around the circumference of the pipe, forming multiple layers. In one example, the layers are formed by spirally wrapping around the outer surface of pipe 1. In one example, the axial length of the full composite material thickness is at least one-half pipe diameter.

In one example, the composite material wrap of the crack arrestor is composed of one layer, the thickness of the layer tapered from a minimum at the axial ends to a greater thickness in the middle portion away from the axial ends.

In one example, the thickness of the constant full thickness zone of the composite material is approximately equivalent to the thickness of the wall of the metal pipe.

In one example, crack arrestor 2 comprises one or more wraps of a composite material and pipe. In one example, the composite material comprises a resin and a fiber. In one example, the pipe comprises a metal.

In one example of a crack arrestor, a six-inch (6") nominal pipe is used. The zone C full thickness of the composite material is set to be about the same as the thickness of the wall of the pipe three and one-half inches (3.5") in length. The composite material tapered length on each end of the full thickness is set to start at the full thickness and reduce to zero thickness in about one and one-half inches (1.5") in length. Zone D is thus about six inches (6") in length. In this example, a radial force zone P is set to about three inches (3") and is centered in the middle of full thickness zone C of the composite materials. In this example, an internal radial force sufficient to over-strain the pipe is provided at about 3,000 to 6,000 pounds per square inch, or an equivalent mechanical radial force is provided.

In one example, for larger diameter pipe, zone C full thickness of the composite material is set to somewhat less than the pipe wall thickness than if one simply scaled from the smaller six-inch (6") pipe, described above, to the larger pipe. The zone C length of the composite material is likewise somewhat less than if proportionally scaled from the six-inch (6") pipe example. The internal radial load to over-strain the pipe depends the on the thickness and strength of the pipe material.

In one example, the disclosed crack arrestor is useful in stopping the propagation of axial cracks in high pressure gas pipelines.

One unexpected advantage was that the residual compressive hoop stress in the pipeline metal positively halts the crack propagation such that it cannot proceed in the area of reduced hoop stresses.

"Ring-out" is a term used for an axial crack that stops at an arrestor, but then proceeds circumferentially around the pipe wall, cutting off the pipe at the arrestor.

Another observed advantage is that the tapered composite material thickness permits the fibers of some of the thinner layers of composite material to rupture as the crack propagates into the arrestor. This absorbs some of the energy that is driving the crack without abruptly stopping the crack and causing ring-out.

Another surprising result is that the tapered thickness of the composite material installation results in reduced ring bending moment in the pipe metal at the edge of the composite material's thinner layers. This is compared with the ring bending moment should the full thickness of the composite material be encountered all at once.

Method of Manufacture. In one example, a crack arrestor is made by disposing a composite material 2 around a length of pipe 1. In one example, the pipe is ductile metal. In one example, the composite material includes non-metallic fibers and resin. In one example, a fiberglass and resin composite is used. The disposed composite material has fibers generally aligned to the pipe circumference. In one example, the composite material fibers are hoop wrapped around a pipe. In one example, the hoop wrapping of the composite material fibers is performed in a tapered fashion so as to gradually increase the thickness of the composite material layer until a full composite material thickness is achieved. In one example, the axial length of the full composite material thickness is typically one-half pipe diameter or more. In one example, the composite material is allowed to cure.

Radial force is then applied inside the pipe. The sufficient radial force is applied yielding the pipe past the elastic limit of the pipe and creating circumferential tension on at least a portion of the composite material. Thus, in one example, a portion of the full composite material thickness when subjected to a radial force that causes the pipe metal to yield is loaded in the circumferential direction without causing the composite fibers to break. In one example, a portion of the full composite material thickness is subjected to a radial force that causes the pipe metal to yield such that any fiber breakage is not significant to the operation of the crack arrestor.

In one example, the radial force is applied within the portion of the pipe that is covered or otherwise wrapped by the full thickness of the composite material. In one example, this is done with an internal radial force-balanced, double-ended plug to limit the extents of pressurization. In one example, a mechanical or hydraulic pipe expander yields the pipe past the elastic limit of the pipe. In one example, radial force is not applied outside the portion of the pipe that is covered or otherwise wrapped by the full thickness of the composite material.

At least a portion of the composite material remains in circumferential tension upon release of the applied radial force. This radial force or quasi-autofrettage results in the metal of the pipe in the radial force zone being in residual hoop compression after the over-strain process. In one example, the composite material remaining in tension is bounded along the axis of the pipe by disposed composite material tapered in thickness from the thickness of the composite material remaining in tension.

Operation. Thus, in one example presented herein is a process for arresting a crack in a pipe. The process includes maintaining circumferential tension in a composite material wherein the composite material resides around a metal pipe; and maintaining compressive circumferential residual stress on the pipe with the composite material. In one example, the composite is non-metallic fibers and resin. In one example, the metal pipe is a section, or joint, of ductile pipeline steel.

The foregoing description is presented for purposes of illustration and description, and is not intended to limit the invention to the forms disclosed herein. Consequently, variations and modifications commensurate with the above teachings and the teaching of the relevant art are within the spirit of the invention. Such variations will readily suggest themselves to those skilled in the relevant structural or mechanical art. Further, the embodiments described are also intended to explain the best mode for practicing the invention, and to enable others skilled in the art to utilize the invention and such or other embodiments and with various modifications required by the particular applications or uses of the invention.

The invention claimed is:

1. A process for arresting a crack in a pipe, the process comprising:
   maintaining circumferential tension in a composite material wherein the composite material resides around a metal pipe; and
   maintaining compressive circumferential residual stress on the pipe with the composite material.

2. The process of claim 1 wherein the composite material is non-metallic fibers and resin.

3. A method for making a crack arrestor, the method comprising:
   disposing a composite material around a length of pipe;
   wherein the composite material comprises non-metallic fibers and resin;
   wherein the disposed composite material comprises fibers aligned to the pipe circumference;
   applying radial force inside the pipe, the radial force applied yielding the pipe past the elastic limit of the pipe and creating circumferential tension on at least a portion of the composite material; and
   wherein at least a portion of the composite material remains in circumferential tension upon release of the applied radial force.

4. The method of claim 3 wherein a mechanical or hydraulic pipe expander yields the pipe past the elastic limit of the pipe.

5. The method of claim 3 wherein the composite material remaining in tension is bounded along the axis of the pipe by disposed composite material tapered in thickness from the thickness of the said composite material remaining in tension.

6. A crack arrestor comprising:
   a metal pipe having a length and an outer surface wherein a portion of the length of the metal pipe is comprised of yielded metal;
   a composite material having a first thickness in circumferential tension disposed circumferentially around the outer surface of the yielded metal portion of the metal pipe and having a second thickness disposed circumferentially around the outer surface of the metal pipe axially adjacent to the yielded metal portion; and
   wherein the second thickness is less than the first thickness.

7. The crack arrestor of claim 6 wherein the second thickness decreasingly tapers in thickness from the first thickness in the axial direction away from the yielded metal portion.

8. The crack arrestor of claim 6 wherein the second thickness decreasingly tapers step-wise in thickness from the first thickness in the axial direction away from the yielded metal portion.

9. The crack arrestor of claim 6 wherein the composite material is non-metallic fibers and resin.

10. The crack arrestor of claim 6 wherein the axial length of the first composite material thickness is at least one-half pipe diameter.

11. A crack arrestor comprising:
    means for maintaining circumferential tension in a composite material wherein the composite material resides around a metal pipe; and
    means for maintaining compressive circumferential residual stress on the pipe with the composite material.

* * * * *